United States Patent [19]

Cramer

[11] 4,158,697
[45] Jun. 19, 1979

[54] COAL TREATMENT APPARATUS

[75] Inventor: Frank B. Cramer, Mission Hills, Calif.

[73] Assignee: Clean Energy Corporation, Burbank, Calif.

[21] Appl. No.: 735,818

[22] Filed: Oct. 26, 1976

Related U.S. Application Data

[62] Division of Ser. No. 644,712, Dec. 29, 1975, Pat. No. 4,104,056, which is a division of Ser. No. 512,539, Oct. 7, 1974, Pat. No. 3,966,583.

[51] Int. Cl.² .......................... B01J 1/00; B01J 8/08; C10J 3/20; F28D 19/00
[52] U.S. Cl. ........................................ 422/189; 48/73; 48/197 R; 48/202; 165/107 R; 165/DIG. 2; 422/198; 422/206; 422/230; 422/235; 422/242
[58] Field of Search ................. 23/262, 288 E, 288 H, 23/260 (U.S. only 1963 to date); 48/202 (U.S. only 1963 to date), 197 R (U.S. only 1971 to date), 73 (U.S. only), 99, 108, 111 (U.S. only); 165/107 (U.S. only 1952 to date); 208/8 (1975 to date), 10 (1975 to date), 11 R (1975 to date)

[56] References Cited

U.S. PATENT DOCUMENTS

| | | | |
|---|---|---|---|
| 3,252,773 | 5/1966 | Solomon et al. | 48/202 |
| 3,441,380 | 4/1969 | Morrow | 23/260 |
| 3,441,394 | 4/1969 | St. Clair | 48/202 |
| 3,567,412 | 3/1971 | Lefrancois et al. | 48/202 |
| 3,647,379 | 3/1972 | Wenzel et al. | 48/202 |
| 3,690,550 | 9/1972 | Hilberath et al. | 48/197 R X |
| 3,770,399 | 11/1973 | Chong | 48/202 |
| 3,790,469 | 2/1974 | Loth et al. | 208/10 |
| 3,847,797 | 11/1974 | Pasternak et al. | 48/202 X |
| 4,038,035 | 7/1977 | Ergenc et al. | 23/288 H X |

Primary Examiner—Joseph Scovronek
Attorney, Agent, or Firm—Louis J. Bachand

[57] ABSTRACT

Apparatus for the processing of solid fuel hydrocarbons including a reactor for hydrogenation of the fuel reactant and a combustion reactor for oxidation of the residuum from the first reactor, the solid fuel reactant being dissolved in molten salt throughout its processing; and heat recovery means including a molten metal loop and a steam loop whereby the excess heat from the hydrogenation and oxidation reactors, present in the molten salt reaction matrix, is recovered in molten metal and transferred to the steam loop for energy production while avoiding cross contamination of the steam loop with salt from the reaction loop, and vice-versa.

12 Claims, 3 Drawing Figures

CROSS BONDING TO MORE HETEROCYCLIC GROUPS

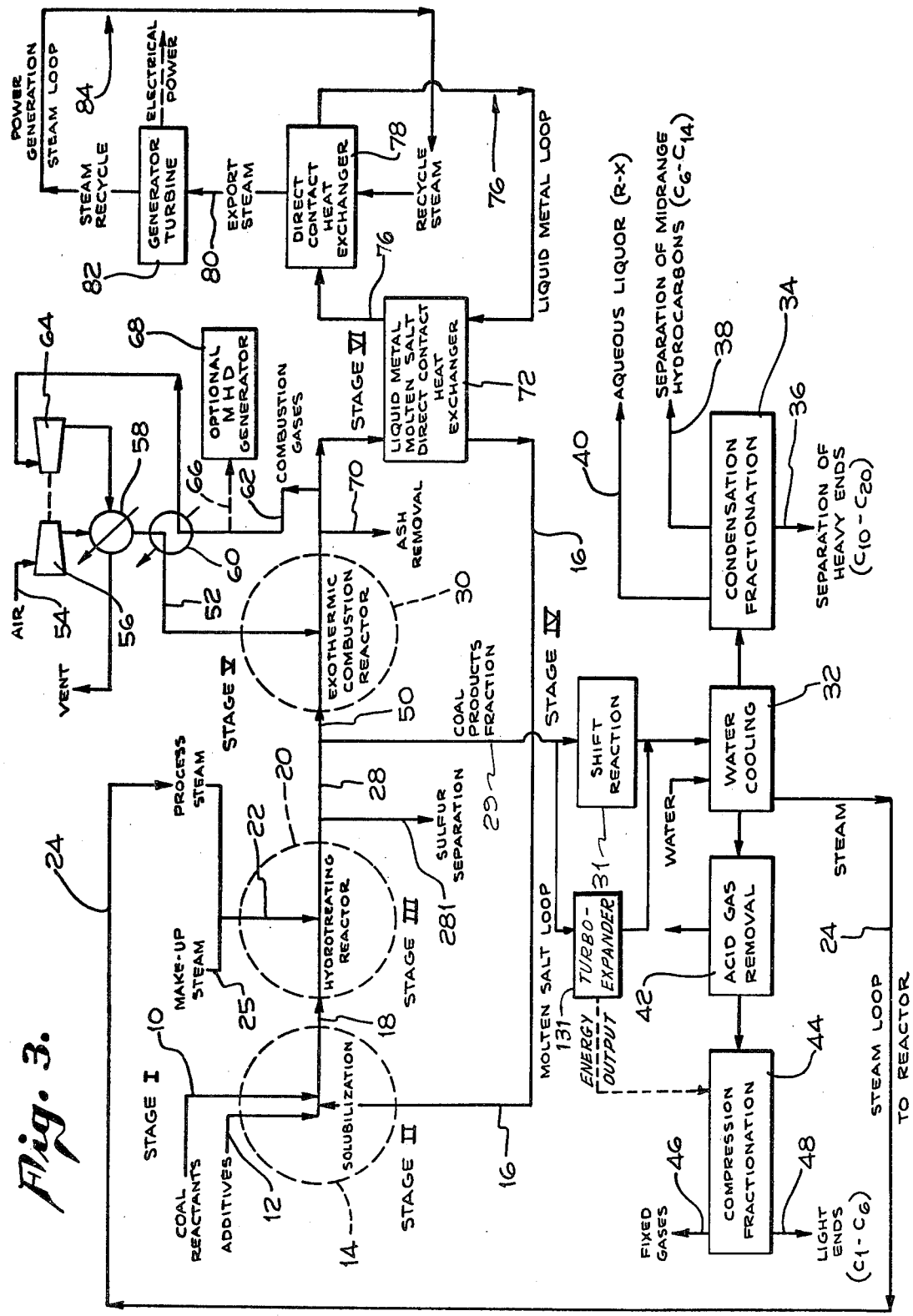

COAL TREATMENT APPARATUS

This application is a division of Ser. No. 644,712, filed Dec. 29, 1975, now U.S. Pat. No. 4,104,056, issued Aug. 1, 1978, which in turn is a division of application Ser. No. 512,539 filed Oct. 7, 1974, now U.S. Pat. No. 3,966,583, issued June 29, 1976.

BACKGROUND OF THE INVENTION

This invention has to do with an integrated system for the efficient, low cost derivation of both chemicals and heat energy from carbonaceous solid fuels such as those having phyto-antecedents and, particularly, the lower and middle orders of coal. More particularly, the invention relates to a significant advance in the art and science of processing such solid fuels enabling facile reactions at relatively lower temperatures and pressures than heretofore, with readily available reactant materials and without relates of environmentally obnoxious co-products.

Application of this advance to carbonaceous solid fuel processing in accordance with the invention involves new and useful apparatus and techniques for:
(a) hydrotreating and combustion reactions;
(b) recovery of hydrotreating products and heat energy;
(c) control and reuse of heat values throughout the process;
(d) pretreatment and conditioning of reactants;
(e) interexchange of heat between different heat exchange media circulating in separate but interconnected loops;
(f) production of steam;
(g) production of electricity from steam; and
(h) isolation and separation of waste products without environmental contamination;

and other and further stages of treatment of carbonaceous solid fuels, their products and by-products.

PRIOR ART

The need for more effective utilization of carbonaceous solid fuels has long been a shibboleth among energy conscious persons in and out of government, and the recent drastic increases in crude oil prices and imposed or real shortages of oil for fuel and raw material use, has further increased interest in carbonaceous solid fuels for all purposes including electric power generation, home heating and synthetic natural gas production. With the realization that oil and coproduced natural gas were not endless in supply nor necessarily cheap, the pace of carbonaceous solid fuel research, primarily regarding subanthracite coal has been quickened with the objective of using the vast reserves of such material within the continental United States. Like few comparable undertakings, the research into conversion of such coal has been thorough with virtually every avenue explored; the literature is extensive and complex, but the definition of the ultimate economic system for coal use has proved elusive. Coal conversion plants have been built and operated, and with some success, at least in the light of present day oil economics. See Annual Report 1973–74 Office of Coal Research: Coal Technology: Key to Clean Energy published by the U.S. Department of the Interior. Nonetheless, no previous effort of which I am aware has been premised on an adaptation of solution reaction kinetics to the problem of coal conversion as a means of reducing capital expenditure, increasing the productivity of obtained heat energy and useful hydrocarbons, and limiting environmental contamination.

In general, the effort to utilize carbonaceous solid fuels has been directed mainly at (a) energy production e.g. power plant applications where the consideration of maximum heat obtention for steam generation had long been paramount until recently an overlay of environmental concern has caused a reevaluation of process parameters; and (b) chemicals production, e.g. primarily synthesis gas (CO and $H_2$) which may then be combined into various organic chemicals, or synthetic natural gas, i.e. methane ($CH_4$) for use as heating fuel, and some hydrocarbons above methane. In each case, the sulfur content of typical coal has been a problem and low sulfur oils and naphthas have been considered as more desirable alternate fuels to these plants; but these feedstocks are subject to governmental allocations.

There have been efforts made to treat coal to remove sulfur and other environmentally harmful constituents of coal either in conjunction with heat producing applications or in connection with attempted chemical production. See for example U.S. Pat. No. 3,779,722 to Tatum. There have been long continued, albeit sporadic efforts to obtain the carbon chain values of coal, i.e. the straight or cyclic chains of $C_2$ to $C_{20}$ molecules, rather than merely carbon oxides (CO, $CO_2$) which result from complete oxidation of the coal. Indeed it is generally acknowledged that coal is a more promising source of carbon chain molecules than oil as the "future" threat of oil shortages becomes imminent. Numerous workers have chronicled, in the Patent Office and in the scientific literature, attempts to separate from coal its constituent fragments in a carbon chain form. Most times these attempts at carbon chain derivatives from coal have been concentrated on destruction of the coal molecule and capture of the fragments of interest. Hydrogen needs to be added to stabilize the fragments against recombination as the naturally occurring carbon to carbon bonds (C—C) are broken. This addition has been accomplished with hydrogen per se and with steam which dissociates at reaction conditions to provide an active, non-molecular form of hydrogen which attaches to the broken carbon bond, converting or completing the coal fragment into a stable hydrocarbon, which may be saturated or unsaturated, aliphatic, alicyclic, aromatic or a heterocyclic molecule depending on the particular coal and fragment converted.

The recovery of the produced hydrocarbon and the utilization of the unconverted coal or residuum has been sought in certain of these previously published efforts, e.g. the COED system.

A leading difficulty in adopting previously disclosed processes for coal treatment has been the lack of adequate rates of conversion to hydrocarbon, lack of adequate rates of heat generation and recovery from coal residuum and the absence of an effective means of accelerating the two operations and coupling them to mutually benefit each separate reaction with an optimized heat transfer loop. This problem has remained largely undetected until recently, because the processes proposed historically were likely uneconomic to start with when measured against low cost oil and natural gas and the tendency was to be tolerant of cost ineffectiveness; but recently more fundamental process diseconomics became apparent as even quantum jumps in prices for oil and natural gas have not made these processes economically viable.

Moreover, modifications of heretofore proposed coal treating processes to, say, increase greatly the rate and quantity of heat produced from residual coal in e.g. molten salt have been uneconomic for the reason that an economical means of obtaining this heat was not provided. Thus the hydrogenation of coal in molten salt requires heat for favorable reaction kinetics, but not all that might be produced by a much more efficient coal residuum combustion; and any increases in rate or efficiency obtained in the hydrogenation process would lessen rather than increase the need for heat from coal residuum combustion. And techniques to put increased quantities of heat to use e.g. in electrical power generation were likewise dependent on improvements in the means to transfer heat out of the combustion reactor and into e.g. steam for turbines.

SUMMARY OF THE INVENTION

Objects of the Invention

It is aganst this background of extensive and expensive coal utilization research and application efforts having thusfar only limited success, heat transfer bottlenecks, environmental concern and increasing need nonetheless to effectively use coal for chemicals and power, that the present invention has been made.

Essentially, the invention in a coal treating embodiment has these objects:

(a) Improved rate and completeness of conversion of coal to the relatively more valuable petro-chemicals, by techniques including prereaction, molten salt solubilizing-conditioning and use of a single phase reaction mass;

(b) Improved heat generation from the coal residuum comprising the less volatile portion of the coal, including use of the same single phase reaction mass;

(c) Improved heat transfer between (a) and (b) reactions with the molten salt reaction medium;

(d) Improved heat transfer between (b) and steam for generators through a distinct intermediate medium;

(e) Improved chemicals separation from (a);

(f) Improved reactor designs for lower capital costs and operating expense; and (g) Separation of ash and acid gas in liquids to prevent contamination of the atmosphere, or of waste aqueous streams.

Feedstocks and Their Solutions

Basic to an understanding of the description to follow is the phenomenon of carbonaceous solid fuel solubility in inorganic molten salts. By the term "carbonaceous solid fuel" herein is meant those substances produced by the compaction and degradation of flora over long periods of time. As such these solid fuels are carbon-based or "carbonaceous" and contain more or less hydrogen, nitrogen, oxygen, and sulfur and various other elements depending on their origin and age and state of decomposition, and are "fuels" or can be oxidized with the release of heat. The term thus includes various "orders" of coal, an index which ranks coals in a series of low to high e.g. lignites, subbituminous, bituminous and anthracite coals. It is with the coals of an order below anthracite that the invention will be described and illustrated, but it is to be borne in mind that much of what is taught herein can be applied, with some modification, to anthracite or oil shale, on the one hand, and on the other hand to carbonaceous solid fuels or waste products having a phyto- antecedent such as cotton, seed hull, and other molecules naturally built of carbon.

SUMMARY PROCESS DESCRIPTION

In accordance with the foregoing the invention provides in the process of sequentially treating carbonaceous solid fuels to produce hydrocarbons and heat energy, the step of maintaining the solid fuel dissolved in molten inorganic salt during the treatment sequence; the introduction of steam into the molten salt solution under fuel hydrogenating conditions; and the introduction of oxidizing gas into the molten solution under fuel oxidizing conditions, after first freeing the molten salt solution of volatile hydrocarbons resulting from the hydrogenation step. The hydrogenation step to produce hydrocarbons and the combustion step to produce heat energy are effected alternately and repetitively in the same molten salt with fresh fuel additions.

In the handling of the hydrocarbon and heat energy production, the invention contemplates removing a hydrocarbons stream from the molten salt in advance of each successive heat energy production step, and removing heat energy from the molten salt in advance of each successive hydrocarbon production step.

The removed hydrocarbons stream is typically processed by cooling the stream to condense vapors of normally liquid hydrocarbons therein, e.g. by expanding the removed hydrocarbon stream through a turbine expander, and compressing lower molecular weight hydrocarbons of the hydrocarbon stream with energy derived from the expansion of the stream.

Additionally the hydrocarbons stream may be processed by shift reacting the removed hydrocarbon stream, stripping the hydrocarbons stream of carbon oxides and hydrogen, depleting the hydrocarbons stream of fixed gases and compressing the stream remaining, e.g. with energy derived from expansion of the removed hydrocarbons stream through an expansion turbine. Moreover, further cooling of the hydrocarbons stream may be realized by heat exchanging the removed hydrocarbons stream with water, liquid or steam, generally following shift reacting of the stream, and adding the resultant steam to steam being introduced into the molten salt solution for the hydrogenation reaction.

The process further contemplates depleting the molten salt effluent from the hydrogenation reaction of sulfur in advance of the heat energy production step, and the addition of an oxidizer such as an oxidizing gas or metal oxide into the molten salt solution of coal or other carbonaceous solid fuel residuum. The oxidizing gas may comprise oxygen, or a gas containing free oxygen such as enriched air or air per se. The ensuing reaction is desirably a substantially complete combustion reaction of dissolved carbonaceous fuel in the molten salt. The combustion gases obtained may be heat exchanged with the oxidizing gases which are to be introduced into the molten salt reaction, and subsequently thereto the combustion gases may be expanded through a turbine and the oxidizing gas compressed with the energy derived from the combustion gas expansion. Alternatively combustion reaction gases may be accelerated through a magnetic field following further treating if necessary, to produce electricity as is known in magnetohydrodynamic (MHD) technology, for which use combustion gases obtained in the present process, which are ash-free, are particularly advantageous.

As mentioned the present process contemplates treating the molten salt to separate undissolved mineral by-products i.e. ash, therefrom. By virtue of the use of a liquid, molten reaction medium, ash by-products are trapped where they are generated and may be separated by e.g. gravitational technqies without ever being airborne or contaminating combustion gases, in accordance with the invention.

Typical process parameters include for hydrogenation, a reaction temperature sufficient to maintain molten the inorganic salt medium and to effect the hydrogenation reaction i.e. typically between about 300° and 500° C; preferably not lower than 250° C. or higher than 600° C., and in most cases between 350° and 425° C. Pressure within the hydrogenation reactor is typically between 1 and 25 atmospheres and preferably between 1 and 10 atmospheres and sufficient to limit unwanted separation of volatiles from solution. Residence times (defined as reactor volume divided by reaction mass flow rate through the reactor) within the hydrogenation reactor are quite short e.g. on the order of 0.2 or 5 seconds to protect against undesired pyrolsis or other destructive reduction of the coal or other carbonaceous solid fuel to gases and char, rather than to condensible hydrocarbon liquids as desired and achieved through the controlled heating treatment described herein. Typically the fuel reactant e.g. coal, is present in a concentration between about 5 and 30% by weight (MAF basis) in the salt in the hydrotreating reactor, and in a concentration of from about 2 to 10% by weight, same basis in the combustion reactor. Other conditions within the combustion reactor include for oxidizing the dissolved char, a temperature above 400° and not more than about 1000° C. and preferably between 600°and 900° C. and a pressure between about 1 and 25 atmospheres and preferably 3 and 10 atmospheres.

SUMMARY DESCRIPTION OF PREFERRED EMBODIMENTS

In preferred embodiments of the process and with reference particularly to treatment of lignite, sub-bituminous and/or bituminous coals the invention comprises the treatment of such coal reactants for the coproduction of hydrocarbons and heat energy, which includes dissolving the fuel reactant in molten salt, introducing the molten salt solution of the reactant into a first reaction zone, intimately contacting the reactant with active hydrogen within the zone preferably with concurrent flow and under hydrogenating conditions sufficiennt to hydrogenate the relatively more volatile portion e.g. up to 50%-85% by weight of the fuel reactant charge, separating overhead a stream comprising hydrogenation produced hydrocarbons, and treating the stream to recover the hydrocarbons; passing the first reaction zone effluent comprising a molten salt solution of the unreacted, less volatile portion of the reactant e.g. 50%-15% thereof by weight of the reactant charge, i.e. the balance of the fuel (coal) reactant, to a second reaction zone, introducing an oxidizing gas into the solution in the second reaction zone under combustion conditions, and in an amount sufficient to substantially completely oxidize said unreacted reactant with release of the heat of combustion into the molten salt, passing combustion gases overhead from the second reaction zone, passing the combustion heated second reaction zone effluent comprising molten salt and ash, if any, back to the first reaction zone after removal of ash, and adding fresh coal reactant thereto, and repeating the hydrogenation and combustion cycle.

Pretreatment

As noted above, the invention further contemplates pretreating and conditioning the carbonaceous solid fuel reactant and for this purpose provides in advance of the hydrogenation reaction zone the step of admixing e.g. between rotating intermeshing surfaces of revolution such as a gear pump the typically pulverulent coal reactant and the molten salt being recirculated from the combustion zone to form a single phase solution of the fuel and salt for introduction into the first zone.

Active Hydrogen

Active hydrogen herein is non-molecular hydrogen and it may be generated in situ in the first reaction zone by introduction of steam into the molten salt and dissociation thereof under hydrogenation conditions prevailing in the first reaction zone as described herein.

Heat Transfer Aspects

The heat transfer principles of the invention are a significant and integral part of the overall process. The recovery of heat from combustion gases to preheat the oxidizing gas, the expansion of these hot gases for compression energy recovery and the recirculation of combustion zone molten salt to the first reaction zone with that portion, if any, of the combustion heat necessary for fuel dissolution, as well as the expansion of the first reaction zone hydrocarbon stream for compression energy recovery and the heat exchange of this stream with water or steam to be subsequently introduced into the first reaction zone, have all been noted above. These techniques are but one aspect of the heat transfer technology of the present invention and with the other apsects now to be briefly indicated, constitute to a major degree the differentiation of the herein disclosed process from previously known, nonintegrated solid fuel reactant proposals, which are generally fragmentary in their approach to heat handling in and between the necessarily separate reaction stages. Even in those systems, properly so called, which do seek to balance heat and reaction aspects throughout the remarkably superior heat transfer capabilities of molten salt have not been as fully exploited as herein.

Specifically, the invention comtemplates a series of direct contact and indirect contact heat exchanges arranged to recover the economic maximum of prodess generated heat. Thus steam to be introduced into the first reaction zone is preheated with heat ultimately derived from the combustion exotherm heated molten salt effluent from the second reaction zone. In a preferred embodiment heat is recovered from the second reaction zone effluent by transferring heat from that effluent to a different density, high specific heat, immiscible liquid such as and preferably a metal and most preferably lead or other high density, high specific heat, low melting, inert, non-reactive elemental or alloy metallic material such as tin and bismuth and their lead alloys. Maximum heat transfer is realized by commingling the liquid, hereinafter molten lead for convenience, with the molten salt, each liquid dispersed into the other for direct contact heat exchange e.g. by being passed differentially e.g. countercurrently through a first heat exchange zone. Subsequently the molten lead is heat exchanged with steam by commingling the steam and molten lead and passing them differentially e.g. countercurrently in a second heat exchange. The lead is recycled. The steam is rapidly superheated by this direct contact heat exchange and may be used to power turbines as with any boiler-produced steam, while the size and this capital cost of steam generating equipment has been reduced by several magnitudes.

This aspect of the process alone signals remarkable reductions in the capital costs of power plants. The rapidity and efficiency of heat transfer from combustion to power turbine by the molten salt molten lead-superheated steam interconnection just described is unequalled to my knowledge by any like purpose system for steam turbine power generation and promises to revolutionize power plant technology in the decades ahead, particularly when coupled with the environmentally clean heat production process from various low order coals described earlier, or with nuclear heat or solar energy primary heat sources.

Secondarily and to complete the heat transfer loops of the invention, the hydrogenation steam for the first reaction zone may also be heated by the molten lead, combined with steam generated in the cooling and condensation of the hydrocarbons stream and fed to the first reaction zone with make-up steam as necessary; and the generator turbine consumed steam may be recycled through the lead-steam direct contact heat exchanger for further superheating.

SUMMARY APPARATUS DESCRIPTION

Apparatus is provided for carrying out the foregoing processes, including apparatus for sequentially treating carbonaceous solid fuels to produce hydrocarbons, heat energy and steam, comprising a first reactor for hydrogenating the fuels, a second reactor for oxidizing fuels not converted to volatile hydrocarbons in the first reactor, a first heat transfer loop comprising recirculating molten salt and communicating the first and second reactors, a second heat transfer loop comprising recirculating heat transfer medium such as the molten metal mentioned and in heat exchange relation with the first loop, and a steam generator in heat exchange relation with the second loop, whereby steam is generated with heat from the first loop through the second loop. The steam generator typically is in a steam loop and the apparatus further may include a generator turbine in the steam loop for generation of electricity and return of expended steam to the steam generator for regeneration.

In the instance of both molten salt-molten metal heat transfer and molten metal-steam heat transfer, means are provided to differentially e.g. countercurrently pass the salt-metal or metal-steam in their respective loops in heat exchange relation. Typically and preferably the salt and metal and the metal and steam media pairs are direct contact heat exchanged for most efficient heat transfer therebetween.

More specifically the invention provides apparatus for the treatment of coal or a like carbonaceous solid fuel reactant for the coproduction of hydrocarbons and heat energy comprising a first reactor, means to introduce steam into the first reactor for hydrogenation of reactant therein, a second reactor, means to introduce an oxidizing gas in the second reactor for oxidation of reactant therein, a recirculating molten salt loop communicating the first and second reactors, means to add reactant to the molten salt loop suitably admixed for solution therein and to hydrogenation thereof with the first reactor and to combustion of the reactant remainder in the second reactor, means to recover hydrogenation product comprising a hydrocarbons stream from the first reactor, and means to recover heat from the molten salt loop. This apparatus may further include a steam loop, and the heat recovery means may then comprise a molten metal loop in heat transfer relation with the molten salt loop and the steam loop. Additionally, this apparatus may include means to pass combustion gases from the second reactor through heat exchange with oxidizing gas and expansion to provide energy to compress the oxidizing gas. Further, the hydrocarbon stream recovery means may comprise means to cool the stream into fractionable liquids and vapors by heat exchange and expansion.

BRIEF DESCRIPTION OF THE DRAWINGS

The invention will be further described as to illustrative embodiments thereof in conjunction with the attached drawings wherein:

FIG. 3 is a detailed schematic of the process.

DESCRIPTIONS OF THE PREFERRED EMBODIMENTS

Coal Structure

Figure 2:
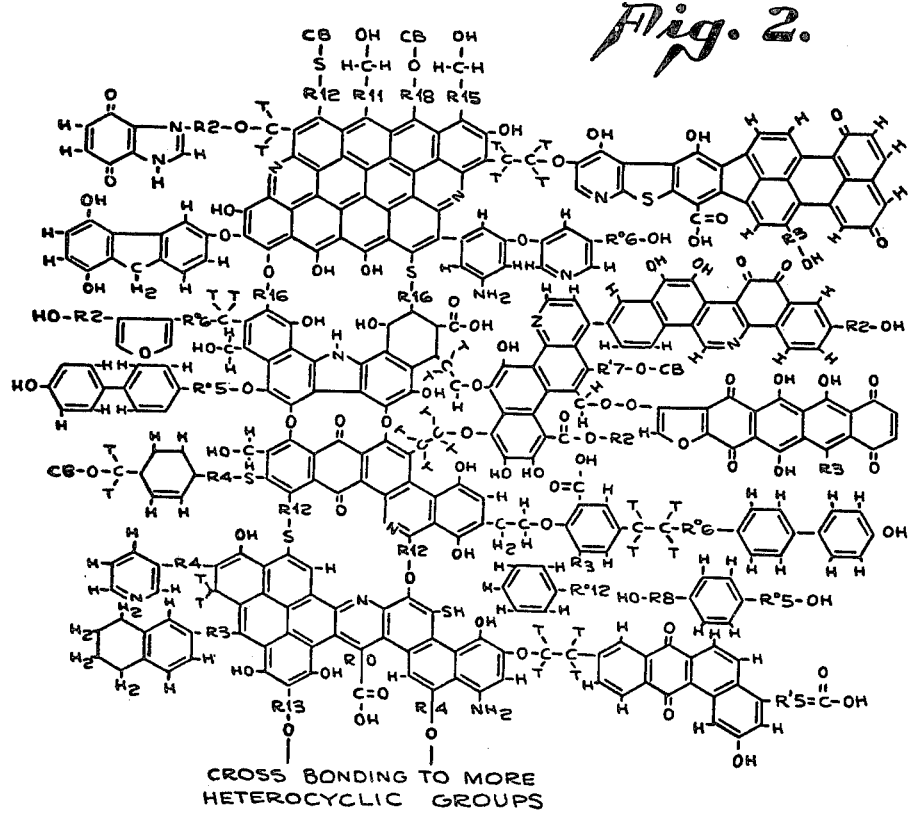
FIG. 2 is a reproduction of a putative coal molecule structure showing the distribution of aliphatic, alicyclic, aromatic and heterocyclic substances therein.

In the ensuing discussion reference will be to coal as typical and illustrative of the process feed material. Initially reference is made to FIG. 2 where a putative structural model of a coal molecule is set out. This model is after G. Hill and L. Lyon published in Industrial and Engineering Chemistry Volume 54, No. 6, June 1962, pages 36–39. The symbols other than for the elements in the Figure have the following meaning:

R°N Alicyclic rings of N carbons
R N Alkyl side chain of N carbons
R'N Unsaturated alkyl side chain of N carbons
C B Cross bonding by O or S to new heterocyclic groups with side chains
T Tetrahedral 3-dimensional C—C bonds, C—O bonds and C—S bonds to layers above and below It will be evident from a consideration of FIG. 2 that coal is a polymeric material of extraordinary complexity and at the same time an abundant source of numerous carbon chain fragments which if separated substantially intact could be a valuable source of raw materials and fuels. To do this the present invention utilizes milder reaction conditions than convert coal to carbon oxides and char and nonetheless at rapid rates of reaction by ensuring that the reaction mass in a single phase of molten salt solvent and coal polymer solute during hydrogenation, and oxidation as well. Additionally, the hydrogenation reaction is not carried beyond the point of optimum hydrocarbon production. Thus moderate temperatures and pressures are used and only the relatively reactive portion of the coal molecule is sought to be reacted, freed from the coal polymer complex and thus volatilized, e.g. between 50 and 85% by weight of a typical coal feed is relatively reactive, while the less reactive, more refractory portion of the coal is not attempted to be converted into volatile hydrocarbons, but is kept in solution and burned in a second reactor. This approach of moderation in temperatures and pressure and extent of conversion is nonetheless highly productive of complete coal utilization by virtue of the exceptionally rapid kinetics of solution reaction in contrast to previously known heterogeneous system surface reactions; and withal of relatively greater amounts of gasoline fractions than other coal treating processes. Moreover, the mobility of the complex coal polymer molecule in the salt solution enables ready attack upon the highly reactive sites on the molecule despite twisted and contorted carbon chains throughout the molecule. Further the swelling and dissolution of the coal polymer molecule serves to free trapped contaminants such as minerals and organic sulfur compounds for easy separation at an appropriate point in the process.

Process Overview

Figure 1:
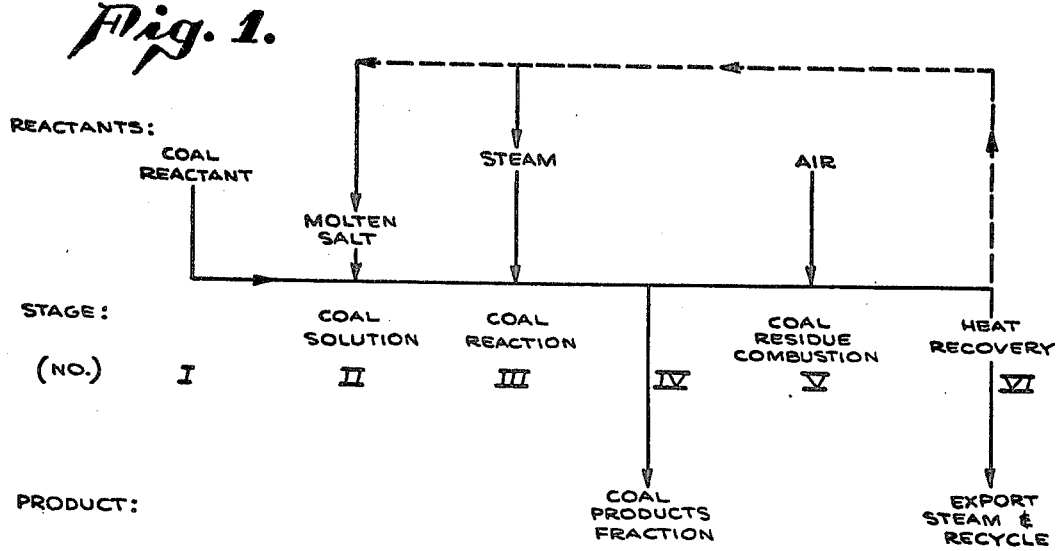
FIG. 1 is a schematic outline of the process operations sequence and heat transfer interrelationships.

An overview of the process is shown in FIG. 1. The reactants are coal, steam and air. The matrix of reaction is molten salt and the products of reaction are a coal products fraction primarily hydrocarbons, and heat energy e.g. in the form of steam for export to another process such as power generation, or for recycling as a reactant. The process consists broadly in a coal reactant feed stage I with the feed being any of the carbonaceous solid fuels hereinabove mentioned and particularly bituminous and subbituminous coal, a coal solution stage, Stage II, in which the coal feed is mixed with molten salt in a manner effecting solution, such as by admixing in a grinding mixer-pump.

Molten Salt Systems

The molten salt is inorganic, ionic and has a melting point within the range of reaction temperatures e.g. between 200° and 500° C. Mixtures of salts may be used, particularly to take advantage of eutectics. An illustrative listing of useful salts and salt mixtures follows:

|  | °C. Melting Point |
|---|---|
| KCl - BaCl$_2$ | 345 |
| KCl - CdCl$_2$ | 380 |
| KCl - PbCl$_2$ | 411 |
| LiCl - PbCl$_2$ | 410 |
| LiCl - SrCl$_2$ | 475 |
| NaCl - CdCl$_2$ | 397 |
| NaCl - CoCl$_2$ | 365 |
| NaCl - PbCl$_2$ | 415 |
| BaCl$_2$ - BeCl$_2$ | 390 |
| BaCl$_2$ - CdCl$_2$ | 450 |
| CdCl$_2$ - PbCl$_2$ | 387 |
| ZnCl$_2$ - SnCl$_2$ | 180 |
| ZnCl$_2$ - SrCl$_2$ | 480 |
| MgCl$_2$ - PbCl$_2$ | 460 |
| PbCl$_2$ - BeCl$_2$ | 300 |
| PbCl$_2$ - BiCl$_2$ | 205 |
| PbCl$_2$ - CaCl$_2$ | 460 |
| PbCl$_2$ - CdCl$_2$ | 387 |
| PbCl$_2$ - CuCl | 285 |
| PbCl$_2$ - FeCl$_3$ | 185 |
| PbCl$_2$ - MnCl$_2$ | 405 |
| PbCl$_2$ - PbI$_2$ | 310 |
| PbCl$_2$ - SnCl$_2$ | 410 |
| PbCl$_2$ - TiCl | 390 |
| PbCl$_2$ - ZnCl$_2$ | 340 |
| KBr - LiBr | 310 |
| I - CdBr$_2$ | 325 |
| I - MgBr$_2$ | 350 |
| NaBr - CdBr$_2$ | 370 |
| NaBr - MgBr$_2$ | 425 |
| PbBr$_2$ - BiBr$_2$ | 200 |
| PbBr$_2$ - CdBr$_2$ | 344 |
| PbBr$_2$ - HgBr$_2$ | 208 |
| PbBr$_2$ - PbCl$_2$ | 425 |
| PbBr$_2$ - PbF$_2$ | 350 |
| PbBr$_2$ - PbI | 282 |

It will be observed that typical salts are halides e.g. fluorides chlorides, iodides and bromides of alkali, alkaline earth, Group II, Group IV, Group V, Group VII and Group VIII metals particularly potassium, lithium, sodium, beryllium, barium, cadmium, zinc, calcium, lead, strontium, cobalt, bismuth, tin, copper, iron, titanium, manganese, mercury, and magnesium. Additionally, the hydroxides and carbonates of alkali metals, being precursors of their salts, may be used, alone or in admixture with the aforementioned salts or others having appropriate melting points

Hydrotreating

The coal in molten salt is hydrotreated with steam in Stage III because the reaction is effected in the melt solution. Pressure is not narrowly critical but moderate superatmospheric pressure is desirable particularly to facilitate treatment of reaction products and therefore pressures of 1 to 25 atmospheres may be used with pressures of 1 to 10 atmospheres being preferred to optimally control volatilization.

While not wishing to be bound to any particular theory of operation, it is believed that within the reactor Stage III molten salt-dissolved coal is hydrocracked by forcing steam into solution in the molten salt which has swollen and solvated the coal polymer network. This severely strains the cross-linking —O— and —S— bonds between the two-dimensional layers of the polymer and between adjacent relatively stable aromatic structures within the layers. The steam dissociates in the ionic, inorganic and therefore highly polar salt, becomes highly reactive, producing active, non-molecular hydrogen which attacks and effectively splits the highly strained bonds. This reaction may be summarized as

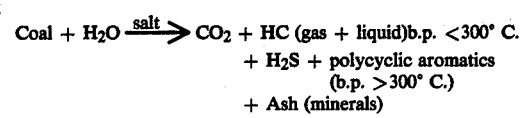

Coal + H$_2$O $\xrightarrow{\text{salt}}$ CO$_2$ + HC (gas + liquid)b.p. <300° C.
+ H$_2$S + polycyclic aromatics
(b.p. >300° C.)
+ Ash (minerals)

The ash and H$_2$S may be removed by conventional technology; the hydrocarbon coal products fraction is further processed to obtain the desired hydrocarbons in Stage IV of the process, while the low volatility polyaromatics still in molten salt solution are passed to Stage V where air or other, e.g. free oxygen containing, oxidizing gas is added, producing combustion and thus heat. The heat is recovered in Stage VI of the process by heat exchange with the molten salt, e.g. as steam for export or recycle, while the molten salt is returned to Stage II for reuse.

DETAILED PROCESS DESCRIPTION

Hydrotreating Process—Stages I–III

With reference now particularly to FIG. 3, in Stage I coal or other carbonaceous solid fuel reactant is introduced at line 10 from a conveyor and sizing system not shown and together with any special purpose additives added through line 12 is passed to Stage II, a hopper-feeder solubilizing arrangement generally indicated at 14 wherein the coal, additives and molten salt received from the molten salt loop, line 16, are intermixed with adequate shear, interdispersed and pumped as a solution-slurry homogenate to Stage III along line 18. Stage III comprises the hydrotreating reactor 20 wherein steam in line 22 comprising steam heat exchanged at 32 and optionally reactor 30 heated, in line 24 and any necessary make-up steam in line 25 is blended and introduced into the cracking or hydrotreating reactor 20, e.g. for flow concurrently through the reactor.

Hydrotreating Theory

It may be mentioned here that polymeric coal while predominantly an aromatic ring structure cross-linked with carbon-carbon bonds, contains as well cross-linkages through oxygen atoms, and sulfur atoms, sulfide, disulfide and hydrogen links. Randomly disposed throughout the loose polymeric network by adsorption, entrapment, or solution or covalent bonding forces are quantities of widely varying low molecular weight materials including methane and homologous aliphatic hydrocarbons. During heretofore known and conventional coking processes, which are carried out at 900° to 1000° C. pyrolysis takes place giving pyrolysis products which consist generally of low molecular weight gases and aromatic ring compounds; the relatively long chain aliphatic molecular fractions which might have been side chains or entrapped in the interstices of the coal structure (being thermally less stable than the aromatic rings) become pyrolyzed i.e. cracked to smaller molecules, or cyclicized to the more stable aromatic ring structures. The initial presence of appreciable quantities of aliphatic hydrocarbons can be demonstrated by the distillation of coal at less than 600° C. whereby an appreciable product fraction distilled comprises aliphatics. See, for example, Richter Textbook of Organic Chemistry, p. 446 (1938, published by John Wiley and Sons. Recent efforts to obtain liquid hydrocarbon from coal have been premised upon solvent extraction and/or hydrogenation wherein as great a percentage as possible of the coal reactant is dissolved in a polycyclic aromatic e.g. anthracene oil, tetralin and the like or a hydrogenated derivative thereof. Upon or during extraction of the aliphatics the molecules are hydrogenated at very high pressures e.g. 50 to 300 atmospheres, of hydrogen pressure which is very costly.

By contrast in reactor 20, according to the present process, dissolution of coal is effected in molten salt at temperatures far below coking temperature. Again without wishing to be bound to a particular theory it is believed that the very high ionization intensity of the molten salt electrical field acts to destablize the resonating aromatic ring structures facilitating their fragmentation. Then when the steam is introduced into the system it dissociates into active moieties including H+ and OH− as well as active nonionic, non molecular hydrogen which may be represented as H*. The destablized ring fragments are of course highly susceptible to addition and/or cleavage reactions with the active moieties from the dissociated steam. This produces a high yield of mid-range moleculr weight aliphatic hydrocarbons e.g. $C_6$ to $C_{14}$ and mixed carbon oxides each of which have lower solubility in the molten salt matrix than the aromatic compounds and steam. Note, for example, U.S. Pat. No. 2,768,935 to Watkins in respect of insignificant solubility of volatilized hydrocarbons in molten salts under hydrogenation conditions and substantial pressure. The resulting preferential ejection of the lower solubility product drives the hydrogenation reaction quickly to completion. The reaction of Stage III requires a certain minimum heat content in the salt and this is maintained as necessary by salt heating in Stage V. It is contemplated, therefore, in the present process that Stage III be conducted as an adiabatic reaction with the only heat input being derived from the heat content of the salt matrix.

Hydrocarbon Product Stream Treatment—Stage IV

Before turning to the molten salt heating phases of the present process, Stage V, it is appropriate here to consider the recovery of hydrocarbons generated in Stage III, reactor 20. With reference to FIG. 3 the coal products fraction, comprising essentially the hydrocarbons and carbon oxides generated in reactor 20, is passed along line 28, after sulfur depletion of the molten salt or hydrocarbon phase into line 281 if necessary, to shift reactor 31, Stage V. The contents of line 28 are essentially the volatiles from reactor 20, and they are obtained at temperatures between about 300° and 500° C. with 400° C. being typical, and at pressures of 3 to 10 atmospheres. These gases may be shift-reacted in zone 31 to increase hydrogen and $CO_2$ contents for use as synthesis gas in certain embodiments of the process. Alternatively the vapors and gases in line 28 may be passed to a recovery zone referred to broadly as Stage IV wherein by water cooling in zone 32, (produced steam being recycled to the reactor 20 via steam loop 24) and fractionation the several hydrocarbons are separated and recovered. By way of illustration only the hydrocarbon vapors may be expanded through a turbo-expander, releasing heat energy and rapidly cooling and ultimately condensing in zone 34 when the hydrocarbons are normally liquid $C_6+$. This fraction may be recovered in several stages from condensation - fractionation zone 34 e.g. heavy ends $C_{10}$–$C_{20}$ in line 36, mid-range hydrocarbons, $C_6$–$C_{14}$ in line 38 and an aqueous liquor containing heteroaliphatic, and miscellaneous fractions summarized as R-X in which X may be hydroxyl, nitrogen, sulfur or like hetero atom or group, in line 40. The lighter ends may be compressed, e.g. with the energy of the turbo-expansion of the vapors, subjected to an acid gas e.g. $H_2S$, separation treatment in zone 42 and fractionated further in zone 44 whereby fixed gases are removed through line 46 and the desired hydrocarbons $C_1$–$C_6$ recovered in line 48.

Residuum Combustion—Stage V

Returning to the molten salt matrix from which only the volatile hydrocarbons have now been separated, this material is passed along line 50 to Stage V comprising the exothermic combustion reactor 30. As shown, air, or other free oxygen containing oxidizing gas is introduced through line 52 into combustion reactor 30 e.g. for countercurrent flow. For purposes of efficiency the air feed from line 54 is precompressed by turbo-compressor 56 and heated successively in heat exchangers 58 and 60 against combustion gases exiting from reactor 30 in line 62. Additionally turbo-expansion of the combustion gases in turbine expander 64 is used to drive the turbo-compressor 56.

MHD Power Generation

It may be noted that combustion gases in line 62, further heated if necessary by means not shown, but e.g. optionally by altering the heat balance to exhaust gases in line 62 from molten salt in loop 16, may be diverted in whole or in part through line 66 to a magnetohydrodynamic (MHD) generator 68 wherein a magnetic field applied across the high temperature, rapidly moving gas generates electricity according to known technology.

Combustion Practice

Within the combustion reactor 30, less volatile e.g. polyaromatic molecules and coal fragments, herein collectively referred to as coal residuum or residual coal and representing the relatively non-volatile 15 to 50% by weight of the coal feed to hydrogenation reactor 20 is intimately mixed with and dissolved in molten salt. Upon addition of the oxidizing gas through line 52, the carbonaceous coal residuum is oxidized, raising the temperature of the molten salt as the heat of combustion is released into the salt, e.g. from an incoming temperature of 400° C. to a temperature of 900°-1000° C. Thus the bulk of the heat of reaction is contained in the sensible heat of the molten salts, rather than in the exhaust gases in the line 62 as occurs in conventional combustion systems.

Combustion Theory

From the theoretical viewpoint, the solubility of coal in molten salt has been noted above. It is important to note here, however, that rates of combustion of coal when dissolved are not surface-area-limited, unlike conventional coal combustion apparatus heretofore known. In the present solution combustion apparatus 30, the rates of combustion are independent of surface area and a function primarily of the degree of interdispersion of the air-molten salt system.

Ore Reduction

Alternative to the use of an oxygen containing gas as the oxidizer in combustion apparatus 30 is the use of non-gas forms of oxygen such as solid oxygen compounds. Particularly useful in this regard are ores of useful metals including specifically and notably the naturally occurring ores of Group VIII metals, most importantly iron and nickel ores. These materials exist in great abundance in the United States but the separation of the iron or nickel component is difficult and costly. Therefore the use of these ores as an oxidizer in the present process meets this great need in a single step. Iron, or nickel is separated from its ore by reduction, as char dissolved in molten salt is oxidized. The iron or nickel, freed from its oxygen bonding is collected from the combustion reaction apparatus by separation from the salt, with concomitantly less heat being recovered from the process overall.

Absence of $NO_x$

At this point another, environmentally significant advantage of the present process may be pointed ut. Bearing in mind the fact of combustion of coal in the dissolved state in molten salt, and the catalytic effect of the molten salt on the reaction, as well as the heat storage capacity of the salt, the temperatures within reaction 30 are enabled to be kept below those temperatures (1000° C.) favorable to the formation of environmentally obnoxious nitrogen oxides ($NO_x$). Thus $NO_x$ is avoided substantially, a uniquely advantageous benefit of the present process over conventional, non-solution coal combustion reactions.

Ash By-Products

The ash(mineral) matter generated in the reactor 30 may be removed in line 70 by conventional technology without ever becoming airborne and thus fly-ash air contamination is reduced by the process and without costly precipitation devices.

Heat Transfer Loops—Stage VI

The utilization of the heat retained in the molten salt forms an important part of the invention. It has been mentioned that the molten salt is recycled to the hydrotreating reactor 20 in molten salt loop 16, 28, 50, wherein it forms preferably the major source of heat for the generally endothermic reaction there.

Nonetheless the quantity of heat released in combustion reactor 30 is far greater than that necessary to sustain hydrotreating reaction.

Accordingly, additional advantageous applications for the superheated salt form a further part of the invention. In this connection, it may be noted that typical coal combustion exhaust gases ave a specific heat of approximately the same order as the above mentioned salt systems, i.e. about 0.2 cal/gm °C. But the exhaust gases have a far lower density obviously than the molten salts, in fact, by a factor of about $10^{-3}$. Therefore molten salts are by orders of magnitude superior heat transfer agents to exhaust gases. This principle is put to practical application in the heat recovery stage, Stage VI of the process. With reference to FIG. 3 it will be seen that the molten salt in loop 16, 28, 50 is heat exchanged with another heat transfer medium, in direct contact heat exchange zone 72. The zone 72 takes maximum advantage of the heat content of the salt from loop 16, 28, 50 by intimately mixing, e.g. countercurrently or by other differential flow technique the molten salt and a liquid heat exchange medium of different, e.g. greater, density, which is both immiscible and inert, and suitably a molten metal such as lead. One may use other metals or materials meeting these criteria. The transfer of heat is nearly instantaneous as the molten metal flows through the molten salt flowing relative to or through it, all within direct contact heat exchange zone 72. Thence the molten salt still containing sufficient heat for the hydrotreating reactor is passed to hydrotreating reactor 20.

The thus heated molten metal is passed along line 74 in molten metal loop 76 to a second direct contact heat exchange zone 78. There steam is directly contacted with the molten metal by countercurrent or other intimate mixing, differential flow technique again effecting a super-rapid heat transfer. The super heated steam may be exported from the process through line 80 e.g. to a steam turbine 82 wherein it may be used to produce electricity and recycled if desired through power steam loop 84.

Example

A molten salt system comprising mixed lithium, sodium, potassium and magnesium chlorides and heated to a molten condition at between 375° and 400° C. is circulated in loop 16 of the system shown in FIG. 3. Coal of the bituminous type suitably prepulverized is introduced at Stage I through line 10 via a conveyor and weigh feeder metering combination (not shown) and admixed with the molten salt in Stage II wherein the coal is further comminuted in salt admixture until solubilized into a single phase homogenate, whence it is passed along line 18 to hydrotreating reactor 20.

In the hydrotreating reactor 20, the dissolved coal is hydrocracked by molten salt dissolved $H_2O$ to a collection of volatile hydrocarbons ("Synthetic Petroleum"), $CO_2$ and a low hydrogen, polynucleated aromatic residual which remains in solution. The volatile hydrocarbons (Synthetic Petroleum) overheads are delivered via line 28, 29 to Stage IV for fractionation, removal of sulfur, and the separation of high calorie line gases, LPG, naphthas, gasolines, kerosine and diesel fuel ranges and clean fuel oil products. The molten salt solution of the coal residuals is passed via line 50 to the exothermic combustion reactor 30 in Stage V. At this point the coal residual is burned. Where the production of heat is desired, an oxidizing gas such as air is passed differentially to molten salt-fuel, oxidizing the remaining fuel and heating the molten salt to the range of 900°–1000° C. The exhaust gases in line 62 have their heat extracted through heat exchangers 58, 60 steps and through use of a turbo-expander 56, 64. The heat content of the molten salt in loop 16 downstream of reactor 30 is extracted in Stage VI by a double cascade of direct contact (fluid commingling) heat exchangers 72, 78 which transfer the heat content from salt to liquid metal to steam to produce steam for export at 80. Driving a steam turbine is a characteristic heat engine use of this product with the steam being continuously recycled in loop 84. The molten salt having yielded its heat to the molten metal loop 76 is recycled again at about 375° to 400° via loop 16 to the solubilization Stage II.

SUMMARY OF ADVANTAGES

The heat generated and used throughout the process is thus balanced and the further objectives of controlling environmental problems i.e. minimizing $NO_x$ production, limiting exhaust gas temperature, eliminating fly ash pollution, and curtailing emissions of sulfurous gases have all been met in a single process, while new heights of efficiency of raw materials utilization and heat transfer have been realized enabling far smaller facilities to meet the needs of a progressively more energy dependent society at lower capital cost and reduced operating expense.

I claim:

1. Apparatus for the treatment of coal or like carbonaceous solid fuel reactant for the co-production of hydrocarbons and heat energy, comprising a first reactor, means to introduce steam into said first reactor for hydrogenation of reactant therein, a second reactor, means to introduce an oxidizing gas into said second reactor for oxidation of reactant therein, a recirculating molten salt loop means communicating said first and second reactors, means to add said reactant to said molten salt loop for solution therein and for hydrogenation thereof within said first reactor and for combination of the reactant remainder in said second reactor, means to recover hydrogenation product comprising a hydrocarbons stream from said first reactor, and second, heat transfer loop means directly heat exhanging said molten salt with an inert, different density, high specific heat, immiscible liquid heat transfer medium commingled therewith in relatively moving relation to recover heat energy from said molten salt loop.

2. Apparatus according to claim 1 in which said heat transfer medium comprises molten metal recirculating in said second heat transfer loop in heat exchange relation with said molten salt loop.

3. Apparatus according to claim 2 in which said heat recovery means further includes a third loop comprising a steam loop, said third loop including a steam generator defined by said recirculating molten metal and a generator turbine for generation of electricity and return of expended steam to said steam generator for regeneration.

4. Apparatus according to claim 2 in which said second loop heat transfer medium comprises recirculating molten lead.

5. Apparatus according to claim 3 including also means to relatively pass the molten salt and molten metal of said first and second loops respectively through each other and in heat exchange relation.

6. Apparatus according to claim 3 including also means to relatively pass in direct contact the salt and metal of said first and second loops respectively through each other for heat transfer therebetween.

7. Apparatus according to claim 3 including also means to relatively pass the molten metal and steam in said second loop and said third, steam loop respectively through each other and in heat exchange relation.

8. Apparatus according to claim 4 including also means to relatively pass in direct contact the molten lead and steam of said second loop and said third steam loop respectively through each other for heat transfer therebetween.

9. Apparatus according to claim 1 including also a third, steam loop, and in which said heat recovery means comprises a molten metal loop in relative movement direct contact heat exchange relation with both said molten salt loop and said steam loop to effect heat recovery from said salt, and transfer thereof into said steam.

10. Apparatus according to claim 1 including also means for compressing said oxidizing gas, means for passing combustion gas from said second reactor through heat exchange means heat exchanging said combustion gas with said oxidizing gas, and combustion gas expansion means having an energy output, said expansion means being coupled to said compression means, to provide compression energy.

11. Apparatus according to claim 1 in which said means to recover said hydrocarbons stream includes coupled hydrocarbon vapor expansion and compression means adapted to cool said stream by heat exchanges and expansion and to subsequently compress said stream into fractionable liquid and vapors with energy output of said expansion.

12. Apparatus according to claim 1 including also means to admix said solid fuel with recirculating molten salt into solution in advance of said first reactor.

* * * * *